US011872607B2

(12) United States Patent
Mackenzie et al.

(10) Patent No.: US 11,872,607 B2
(45) Date of Patent: Jan. 16, 2024

(54) METHOD AND APPARATUS FOR CLEANING FLUID CONDUITS

(71) Applicant: PARADIGM FLOW SERVICES LIMITED, Banchory (GB)

(72) Inventors: Hugh Mackenzie, Banchory (GB); Robert Bain, Banchory (GB)

(73) Assignee: PARADIGM FLOW SERVICES LIMITED, Aberdeenshire (GB)

( * ) Notice: Subject to any disclaimer, the term of this patent is extended or adjusted under 35 U.S.C. 154(b) by 60 days.

(21) Appl. No.: 17/218,540

(22) Filed: Mar. 31, 2021

(65) Prior Publication Data

US 2021/0213490 A1 Jul. 15, 2021

Related U.S. Application Data

(63) Continuation-in-part of application No. 15/470,998, filed on Mar. 28, 2017, now Pat. No. 10,981,201, which is a continuation of application No. 14/111,024, filed as application No. PCT/GB2012/050811 on Apr. 12, 2012, now abandoned.

(30) Foreign Application Priority Data

Apr. 12, 2011 (GB) ..................................... 1106192

(51) Int. Cl.

| | |
|---|---|
| ***B08B 9/032*** | (2006.01) |
| ***E21B 37/00*** | (2006.01) |
| ***E21B 41/00*** | (2006.01) |
| ***E21B 7/18*** | (2006.01) |
| ***E21B 19/08*** | (2006.01) |
| ***E21B 19/22*** | (2006.01) |

(52) U.S. Cl.

CPC .......... *B08B 9/0321* (2013.01); *B08B 9/0325* (2013.01); *E21B 7/18* (2013.01); *E21B 19/08* (2013.01); *E21B 19/22* (2013.01); *E21B 37/00* (2013.01); *E21B 41/0078* (2013.01)

(58) Field of Classification Search

None

See application file for complete search history.

(56) References Cited

U.S. PATENT DOCUMENTS

| | | | |
|---|---|---|---|
| 3,981,048 | A | 9/1976 | Moody et al. |
| 4,655,398 | A | 4/1987 | Liggett |
| 5,033,545 | A | 7/1991 | Sudol |

(Continued)

FOREIGN PATENT DOCUMENTS

| | | | |
|---|---|---|---|
| CN | 201386522 | Y | 1/2010 |
| GB | 2456448 | A | 7/2009 |

(Continued)

*Primary Examiner* — Eric W Golightly

(74) *Attorney, Agent, or Firm* — Saul Ewing LLP

(57) ABSTRACT

An apparatus for cleaning a fluid conduit in a hydrocarbon production installation is described. The apparatus comprises a flexible hose comprising a bore and at least one outlet; a pressure control device; a coupling for an opening of a fluid conduit system; at least one feeding module for engaging the flexible hose and imparting a pushing and/or pulling force on the flexible hose to introduce it through the pressure control device and into or out of the fluid conduit system; and a pump configured to pump a cleaning fluid into the bore of the flexible hose and expel the cleaning fluid into the conduit through the at least one outlet in the flexible hose.

12 Claims, 8 Drawing Sheets

(56) References Cited

U.S. PATENT DOCUMENTS

| | | | |
|---|---|---|---|
| 5,603,378 | A | 2/1997 | Alford |
| 6,170,577 | B1 | 1/2001 | Noles et al. |
| 6,173,771 | B1 | 1/2001 | Eslinger et al. |
| 6,189,609 | B1 | 2/2001 | Shaaban et al. |
| 6,367,557 | B1 | 4/2002 | Rosine et al. |
| 2004/0040585 | A1 | 3/2004 | Honda |
| 2004/0040749 | A1 | 3/2004 | Terry et al. |
| 2006/0169495 | A1 | 8/2006 | Kolle |
| 2008/0105432 | A1 | 5/2008 | Zemlak et al. |

FOREIGN PATENT DOCUMENTS

| | | | |
|---|---|---|---|
| WO | 9814686 | A1 | 4/1998 |
| WO | 2008033738 | A2 | 3/2008 |

METHOD AND APPARATUS FOR CLEANING FLUID CONDUITS

CROSS-REFERENCE TO RELATED APPLICATIONS

This application is a continuation of U.S. application Ser. No. 15/470,998, filed Mar. 28, 2017, and issued as U.S. Pat. No. 10,981,201 on Apr. 20, 2021, which is a continuation of U.S. application Ser. No. 14/111,024, filed Nov. 15, 2013, which claims the priority of PCT/GB2012/050811, filed on Apr. 12, 2012, which claims the benefit of priority to Great Britain Application No. 1106192.6, filed on Apr. 12, 2011, the entire contents of each of which are hereby incorporated in total by reference.

BACKGROUND OF THE INVENTION

The present invention relates to a method and apparatus for use in the hydrocarbon exploration and production industry, and in particular to a method and apparatus for cleaning the inside of fluid conduit systems in hydrocarbon exploration and production installations while fluid is flowing in the fluid conduit system. Aspects of the invention relate to the cleaning of produced water conduits in hydrocarbon production installations. Alternative aspects of the invention relate to the cleaning of marine risers (including production risers), process pipe work, caissons, closed drains, heat exchange systems, or fluid conduits located from the riser to the separator, or located between a flare stack and an export pump in a hydrocarbon exploration and production installation.

During hydrocarbon production and transportation operations, it is common for the interiors of fluid conduits, including pipelines, wellbores, risers and umbilicals, to become fouled. This fouling can lead to the build up of layers of debris, scale or particulate matter on the inside of conduits, which reduces the effective inner diameter (ID) of the conduit and reduces the flow rate. Fouling may also produce blockages in the fluid conduits which completely prevent fluid flow though the conduit. Particulate matter may accumulate on the inside of the wellbore during the drilling, completion and/or workover of a well. In addition, sand and other particulate matter may be produced from the formation and accumulate inside the production tubing, and may partially or completely block fluid flow through the production tubing, decreasing the production rate and the efficiency of the well.

A number of different wellbore cleanout systems have been developed to address these problems. One technique involves the use of coiled tubing, which is a long continuous length of metal piping wound on a spool. The coiled tubing is straightened by plastic deformation and inserted into the wellbore. A cleaning fluid is circulated through the inside of the coiled tubing and back out through the annulus between the coiled tubing and the wellbore. Particulate matter in the wellbore is brought to surface by the circulating fluid.

When performing this type of wellbore operation, it is necessary to employ procedures and equipment for controlling and retaining pressure in the wellbore system to ensure it is isolated from surface. A typical pressure control system includes an injector head, which contains a drive mechanism to push and pull the coiled tubing in and out of the hole through a pressure control device. An injector head has a curved guide (commonly termed a gooseneck) which guides the coiled tubing from a reel into the injector body. The drive mechanism in the injector head includes a number of toothed wheels with hard teeth or steel gripper blocks arranged to engage the outer surface of the coiled tubing. Below the injector head is a pressure control device in the form of a stripper. The stripper contains pack-off elements to provide a seal around the coiled tubing and isolate the pressure in the wellbore. A diverter is located beneath the pressure control device, and functions to divert fluid in the annulus away from the pressure control equipment to be treated and/or re-circulated through the coiled tubing. A pipe cutter designed to be able to cut through the coiled tubing pipe and an isolation valve are located beneath the diverter, and may be used in the event of a catastrophic failure of the system.

In use, the coiled tubing must be pushed into the wellbore against the resistance of the pressure control equipment and the wellbore pressure, and pulled out of the wellbore, overcoming the weight of the inserted coiled tubing. The coiled tubing injector system described above is therefore a substantial and heavy piece of equipment, with large footprint and high capital expense. The coiled tubing injector system also requires a distance of several metres to be available above the isolation valve to accommodate the injector and the gooseneck. This limits the number of installations where coiled tubing operations can be performed and can make operations more costly. These problems are particularly significant in the case of offshore operations, for example in a turret of a floating production storage production and offloading vessel (FPSO) where space is at a premium. Even light coiled tubing units which are used onshore are still substantial pieces of equipment which are large in size and weight in the context of offshore operations.

As well as the issue of the size and weight of coiled tubing injector systems, there are other considerations which limit their applications. Firstly, blockages and restrictions can occur in narrow bore fluid conduits, which are simply too small to receive coiled tubing.

The coiled tubing injector systems described above rely on the rigidity of the coiled tubing to allow it to be pushed into a hole, rather than relying on gravity only (as is the case in wireline operations). However, this rigidity also has drawbacks that make coiled tubing interventions unsuitable for some applications. For example, it may not be possible to inject coiled tubing into a fluid conduit which has a deviated or convoluted path. In extreme cases, the rigid coiled tubing may not be able to pass through some curved or bent pipeline systems. Even where passage is possible, the frictional resistance between the coiled tubing and the inside wall of the wellbore will limit the depth to which the coiled tubing can be deployed. Although friction-reducing clamps have been proposed in some applications, they increase the effective outer diameter of the tubing and may interfere with fluid circulation. In addition, coiled tubing may not easily pass internal restrictions in the conduit such as collars.

An example of an application unsuitable for coiled tubing clean out operations is the cleaning of produced water conduit systems and overboard water caissons. When hydrocarbons are produced, they are brought to the surface as a produced fluid mixture. The composition of this produced fluid generally includes a mixture of either liquid or gaseous hydrocarbons, produced water, dissolved or suspended solids, produced solids such as sand or silt, and injected fluids and additives that may have been used during exploration and production activities. Produced water is separated from the hydrocarbons, typically by gravity separation in a horizontal or vertical separator. The produced water then passes through separate fluid conduits for treatment, storage or discarding. The quantity of produced water that is generated each year is very large, and operators must have systems and processes for managing the water. The produced water can therefore represent a significant component of the cost of hydrocarbon production.

The composition of produced water varies considerably depending on the nature of the formation and the exploration of production processes employed. However, it is common for the inside surfaces of fluid conduits which transport produced water to become deposited with layers of scale and/or other solid material, which build up in the conduit to restrict the effective ID. This can present considerable problems during hydrocarbon production. A restricted produced water flowline can reduce the rate of production, making a producing well uneconomical. Produced water flowlines therefore need to be cleaned at intervals, requiring complete shutdown of production for a period of several hours while the offline produced water conduit is accessed and cleaned using lances manually deployed into an open end of the flowline. Operational difficulties may arise due to the shape of the produced water flowlines (or sections of the flowlines) which may follow deviated or convoluted paths, rendering them difficult to clean by conventional techniques.

For the foregoing reasons, the wellbore cleanout systems according to the prior art are generally unsuitable for applications other than the cleaning of wellbores. In particular, they are unsuitable for applications to the following: process pipe work; caissons; produced water conduits; marine risers (including production risers); closed drains; heat exchange systems; or fluid conduits located between a flare stack and an export pump in a hydrocarbon exploration and production installation.

It is one object of the invention to provide a method and apparatus for cleaning the inside of a fluid conduit system, which has application to a wide range of fluid conduit systems used in the hydrocarbon exploration and production industry.

It is further object of the invention to provide a method and apparatus for cleaning the inside of fluid conduits in the hydrocarbon exploration and production industry, which avoids or at least mitigates one or more of the disadvantages of prior art methods and apparatus.

Another aim and object of the invention is to provide a method and apparatus for cleaning the inside of a fluid conduit in a hydrocarbon production or transportation system while fluid flows in the conduit (i.e. without a requirement to cease or shutdown operations).

Further aims and objections of the invention will become apparent from reading the following description.

SUMMARY OF INVENTION

According to a first aspect of the invention, there is provided a method of cleaning a fluid conduit in a hydrocarbon production installation, the method comprising:

providing a feeding module for a flexible hose, the feeder module configured to engage an outer wall of the flexible hose and impart a pushing and/or pulling force on the flexible hose;

introducing a flexible hose into a fluid conduit system through a pressure control device;

running a first end of the flexible hose into a conduit to be cleaned while a fluid stream flows in the conduit;

cleaning at least one substance from the conduit by pumping a cleaning fluid into a bore of the flexible hose and expelling the cleaning fluid from the flexible hose into the conduit through at least one outlet in the flexible hose; and carrying the at least one substance in the fluid stream to a conduit outlet.

The cleaning fluid may comprise water, and may be seawater. Alternatively or in addition, the cleaning fluid may comprise a solvent, and may comprise at least one additive. The solvent may be an organic solvent. The cleaning fluid may comprise a hydrocarbon fluid such as diesel.

The method may include the step of forcibly displacing the at least one substance from the conduit by jetting of the cleaning fluid from the hose.

The method may include engaging an outer wall of a flexible hose by indenting the wall of the flexible hose.

The method may comprise deploying the hose into the conduit at least in part using drag force imparted by the fluid stream.

The method may comprise pumping fluid during deployment of the hose. The method may include deploying the hose at least in part using a fluid jetting force from cleaning fluid expelled from the hose. The method may include jetting cleaning fluid in a rearward direction of the hose (i.e. a direction opposed to the direction of deployment).

The method may comprise retracting the hose from the fluid conduit while the fluid stream flows in the conduit.

The method may comprise passing a distal end of the hose through the pressure control device and subsequently attaching a nozzle to the hose. The method may include the subsequent steps of coupling the apparatus to a fluid conduit system. Subsequently, an isolation valve may be opened to expose the apparatus to the fluid conduit system.

The method may comprise coupling a nozzle to the hose after the end of the hose is passed through the pressure control device.

The method may include expanding a nozzle extension portion from a first retracted position to a second expanded position.

According to a second aspect of the invention, there is provided an apparatus for cleaning a fluid conduit in a hydrocarbon production installation, the apparatus comprising:

a flexible hose comprising a bore and at least one outlet;

a pressure control device;

a coupling for an opening of a fluid conduit system;

at least one feeding module for engaging the flexible hose and imparting a pushing and/or pulling force on the flexible hose to introduce it through the pressure control device and into or out of the fluid conduit system; and a pump configured to pump a cleaning fluid into the bore of the flexible hose and expel the cleaning fluid into the conduit through the at least one outlet in the flexible hose.

Embodiments of the second aspect of the invention may comprise preferred and/or optional features of the first aspect of the invention or vice versa.

By using a flexible hose, the method and apparatus according to the invention overcomes one or more drawbacks of the prior art. In particular, the flexible hose, in contrast to the coiled tubing that is used in wellbore cleanout applications, is sufficiently flexible to be injected into fluid conduits which have deviated or convoluted paths, as are commonly found in fluid conduits to which the invention is intended to be applied (for example in the fluid conduits located between a flare stack and an export pump in a hydrocarbon exploration and production installation). In this context, the flexible hose may be one that is capable of being bent or flexed repeatedly without significant damage to the hose material. For example, the flexible hose may be capable of being flexed or bent without plastic deformation of the hose material and/or without imparting significant levels of fatigue.

The flexible hose may be a composite hose comprising at least one plastic layer and at least one metal layer. Preferably the hose comprises a plastic inner core (which may be polyamide or polyoxymethylene), a plastic outer layer (which may be a polyamide) and at least one metal layer disposed between the inner core and the outer layer. The outer layer may therefore have a lower coefficient of friction than a metal surface of coiled tubing. Preferably the at least one metal layer is a metal sheath formed from braided wire. Preferably the braided wire is steel wire.

Preferably the hose has an inner diameter in the range of 5 mm to 60 mm. For narrow bore cleaning applications, the flexible hose preferably has an inner diameter of approximately 5 mm to 30 mm. For larger bore applications, such as produced water flowlines, the flexible hose preferably has an inner diameter of approximately 20 mm to 60 mm. A preferred embodiment uses a flexible hose having an internal diameter of approximately 25 mm and an outer diameter of approximately 37 mm.

The minimum elastic bending radius is a convenient way of measuring the flexibility of a hose. Preferably the flexible hose has a minimum elastic bending radius of less than 100 times the inner diameter of the hose. The flexible hose may have a minimum elastic bending radius of less than 60 times the inner diameter of the hose.

More preferably, the flexible hose has even greater flexibility, and has a minimum elastic bending radius of less than 40 times the inner diameter of the tubing. In certain embodiments, the flexible hose has a minimum elastic bend radius of less than 20 times the inner diameter of the tubing. The hose may have a minimum elastic bend radius of approximately 12 times the inner diameter of the tubing in a preferred embodiment of the invention.

The flexibility of the hose is a clear distinction from coiled tubing applications. Typically steel coiled tubing has a minimum elastic bending radius of around 200 times the inner diameter of the tubing. The flexibility of the hose of the present invention offers a number of advantages. Firstly, each hose may be wound on to a spool with smaller diameter. This allows for compact storage of the flexible hose at the work site. Secondly, the flexibility of the hose allows preferred orientations of the apparatus. In particular, the flexibility of the hose permits the feeding module, or a part of it, to be positioned at an angle to the chamber. For example, the feeding module may be located substantially orthogonal to the chamber with an appropriate guide for the flexible hose being located between the stripper and the chamber. This allows alternative, space saving configurations at the work site. In addition, the flexibility of the hose allows closer placement, and greater bending of the guide when compared with a gooseneck used in coiled tubing applications.

An additional advantage of using a flexible hose is its comparatively low weight. This means that although the inherent flexibility of the hoses limits their resistance to high injection forces, the fluid moving in the fluid conduit system in the direction of the deployment of the hose facilitates its injection. In other words, the fluid flow helps to draw the hose into the conduit systems. Furthermore, jetting at least a proportion of cleaning fluid from the hose in a rearward direction of the hose (i.e. opposing the direction of the deployment of the hose), facilitates its injection. In other words, the jetting of the cleaning fluid also helps to draw the hose into the conduit systems. These effects would not be apparent in using carbon steel coiled tubing injection systems. The apparatus may therefore comprise a nozzle configured to produce a rearward fluid jet which provides a propulsive force on the hose. The nozzle may comprise a plurality of rearward facing fluid outlets, which may be circumferentially spaced. A consequential benefit is the use of lower injection forces.

Preferably, the feeding module comprises a drive mechanism. Embodiments of the present invention use a drive mechanism to minimise surface damage, penetration and/or crushing of the flexible hose. The feeding module for the flexible hose can be significantly lower weight and smaller size than the coiled tubing injector systems used in wellbore cleanout operations, which facilitates application of the invention in a wide range of fluid conduit systems.

In a preferred embodiment the drive mechanism comprises at least one chain, and may comprise one or more chain-driven blocks. The one or more chain blocks may comprise one or more teeth or ridges configured to engage with a flexible hose. Preferably the chain blocks are configured to engage with the outer surface of the flexible hose by forming an indentation in the outer surface, which may be formed to a depth of around 1 mm. Preferably the indentations are formed to a depth of less than 1 mm. This embodiment allows engagement with the flexible hose sufficient to inject or retract the hose, but does not penetrate the hose.

Preferably, the blocks comprise a concave surface, which may be part-circular in profile. The blocks may comprise one or more part-circular teeth or ridges. Preferably, a plurality of teeth or ridges is provided at longitudinally separated locations along the block.

The teeth or ridges may be shaped to provide a directional engagement. This may mean that the engaging force in one direction is greater than the engaging force in an opposing direction. Preferably the teeth or ridges are formed to different heights, and teeth or ridges disposed at or around the longitudinal centre of the block may be higher than teeth or ridges disposed further away from the longitudinal centre of the block.

The drive mechanism may comprise a contact surface for contacting an outer surface of the flexible hose. In one embodiment, the contact surface is substantially smooth. This contrasts with the arrangements of prior art injector heads for coiled tubing, which include hard teeth or steel gripper blocks arranged to engage the outer surface of the coiled tubing. The drive mechanism comprises at least one belt which may be driven by wheels. The contact surface may be a belt. Alternatively, the contact surface may be the surface of a wheel.

Preferably, the feeding module is capable of applying a pushing force or a pulling force equivalent to a weight greater than 100 kg. More preferably, the feeding module is capable of applying a pushing force or a pulling force equivalent to a weight greater than 300 kg.

The feeding modules may comprise a plurality of feeding units. Each feeding unit may comprise a drive mechanism, which may comprise at least one chain, and may further comprise one or more chain-driven blocks.

Preferably, the apparatus comprises a chamber located between the pressure control device and an opening for coupling to a fluid conduit system. The chamber preferably provides access to the flexible hose beneath the pressure control device.

Preferably, the apparatus further comprises a valve, which may be a blowout preventer. The apparatus preferably comprises a cutting device configured to cut, shear, or sever the flexible hose. The cutting device may be incorporated as part of a valve, which may be a shear and seal blowout preventer.

The apparatus may comprise a gripping mechanism, which may be arranged to retain a portion of the flexible hose in the apparatus.

The pressure control device may comprise one or more elastomeric seals or pack-off elements, which may be stripping elements. The pressure control device may be hydraulically actuated. Alternatively or in addition, the pressure control device may be mechanically actuated. Preferably the pressure control device comprises at least two elastomeric seals, arranged so that a second elastomeric seal functions as a back-up to a first elastomeric seal.

According to a third aspect of the invention, there is provided a modular system for cleaning a fluid conduit in a hydrocarbon production installation, the modular system comprising:

a pressure control module configured to be coupled to an opening of a fluid conduit system;

a first feeding module for imparting a pushing and/or pulling force on a flexible hose to introduce it through the pressure control module into or out of the fluid conduit system;

a second feeding module for imparting a pushing and/or pulling force on the flexible hose to introduce it through the pressure control module into or out of the fluid conduit system, The first and second feeding modules may be substantially identical, and/or may be interchangeable in the system to separately impart a pushing and/or pulling force on the flexible hose. This provides redundancy in the modular system. Alternatively, or in addition, the first and second feeding modules may be selected to differ in one or more of the following characteristics: maximum pushing and/or pulling force; size; weight; footprint; diameter of flexible hose which can be accommodated; engagement mechanism for a flexible hose. Accordingly, the modular system may provide different feeding modules which can be selected for use in the system depending on the application. Considerations will include: the outer diameter of the flexible hose to be deployed; the depth to which the flexible hose will be deployed; radial and/or tensile strength characteristics of the flexible hose; robustness of the outer wall of the hose; characteristics of the fluid conduit system, including diameter, flow rate, and flow pressure.

Preferably, the first and second feeding modules are configured to be used together to impart a pushing and/or pulling force on a flexible hose. Thus the first and second feeding modules may be used in series to each impart a pushing and/or pulling force on the flexible hose. Such a configuration has several additional advantages. Firstly, the maximum pushing and/or pulling force on the flexible hose may be increased for applications in which this is necessary or desirable. This may, for example, allow increased depth of deployment; use in higher pressure fluid systems; allow greater integrity of seal of the elements in the pressure control module; and/or deployment of flexible hoses (and/or nozzles) of different types which have a greater resistance to deployment into the fluid conduit system. This can be achieved without increasing the radial pressure of engaging mechanisms in the feeding modules beyond an acceptable value, as the force may be distributed over a greater length of the hose. This prevents damage to the outer wall of the flexible hose which may otherwise result from a requirement to impart a greater radial force on the hose where an increased pushing and/or pulling force is required.

Alternatively, the first and second feeding modules may be used to impart the same magnitude of pushing and/or pulling force on a flexible hose for a lower radial/engaging force on the hose. This may facilitate using alternative hose types, including those with less robust outer walls or reduced radial compressive strength. This may allow use of flexible hoses with even greater flexibility.

It is an advantage of this aspect of the invention that the above-described benefits may be selectively obtained by operating the system with the first and second feeding modules in series when the application makes this necessary or desirable. However, for those applications which only require a single feeding module, one module can be used in isolation. This reduces the overall size, weight and footprint of the system. Furthermore, the flexible hoses may be subject to wear from the engaging action of the drive mechanism, and it is therefore desirable to use only the pushing and pulling forces necessary for the operation to avoid additional wear on the hose.

One or more of the feeding modules may be portable, and may comprise a frame or chassis mounted on wheels or rollers. One or more of the feeding modules may comprise a plurality of feeding units. Each feeding unit may comprise a drive mechanism, which may comprise at least one chain, and may further comprise one or more chain-driven blocks. The one or more chain blocks may comprise one or more teeth configured to engage with a flexible hose. Preferably the chain blocks are configured to engage with the outer surface of the flexible hose by forming an indentation in the outer surface, which may be formed to a depth of around 1 mm. Preferably the indentations are formed to a depth of less than 1 mm. This embodiment allows engagement with the flexible hose sufficient to inject or retract the hose, but does not penetrate the hose.

Embodiments of the third aspect of the invention may comprise preferred and/or optional features of the first or second aspects of the invention and vice versa.

According to a fourth aspect of the invention, there is provided a method of cleaning a produced water fluid conduit in a hydrocarbon production installation, the method comprising:

introducing a flexible hose into a fluid conduit system through a pressure control device;

running a first end of the flexible hose into a produced water conduit to be cleaned while produced water flows in the conduit;

cleaning at least one substance from the conduit by pumping a cleaning fluid into a bore of the flexible hose and expelling the cleaning fluid from the flexible hose into the conduit through at least one outlet in the flexible hose; and carrying the at least one substance in the produced water to a conduit outlet.

Embodiments of the fourth aspect of the invention may comprise preferred and/or optional features of the first to third aspects of the invention and vice versa.

According to a fifth aspect of the invention, there is provided a method of cleaning a marine riser in a hydrocarbon production installation, the method comprising:

introducing a flexible hose into a fluid conduit system through a pressure control device;

running a first end of the flexible hose into a marine riser to be cleaned while fluid flows in the marine riser;

cleaning at least one substance from the marine riser by pumping a cleaning fluid into a bore of the flexible hose and expelling the cleaning fluid from the flexible hose into the marine riser through at least one outlet in the flexible hose; and carrying the at least one substance in the fluid to a marine riser outlet.

The invention has particular application to the offshore industry and therefore the hydrocarbon production installation may be an offshore installation.

Embodiments of the fifth aspect of the invention may comprise preferred and/or optional features of the first to fourth aspects of the invention and vice versa.

According to a sixth aspect of the invention, there is provided a nozzle device for cleaning a fluid conduit in a hydrocarbon production installation, the nozzle device comprising an inlet for coupling to the bore of a hose, a main body, and at least one nozzle extension portion in fluid communication with the bore of the hose and comprising an outlet for fluid passing through the nozzle.

Embodiments of the sixth aspect of the invention may comprise preferred and/or optional features of the first to fifth aspects of the invention and vice versa.

The nozzle extension portion may be configured to locate the outlet at a radial position outside of the radial dimension of the hose and/or main body of the nozzle. Preferably, the nozzle extension portions are moveable from a first retracted to a second extended position.

Preferably, the nozzle extension portion extends at an angle to the longitudinal axis of the nozzle. Preferably, the device comprises a plurality of nozzle extension portions.

Preferably, the nozzle is configured to be removably coupled from the hose.

BRIEF DESCRIPTION OF THE DRAWINGS

There will now be described, by way of example only, various embodiments of the invention with reference to the drawings, of which.

DETAILED DESCRIPTION

Figure 1:
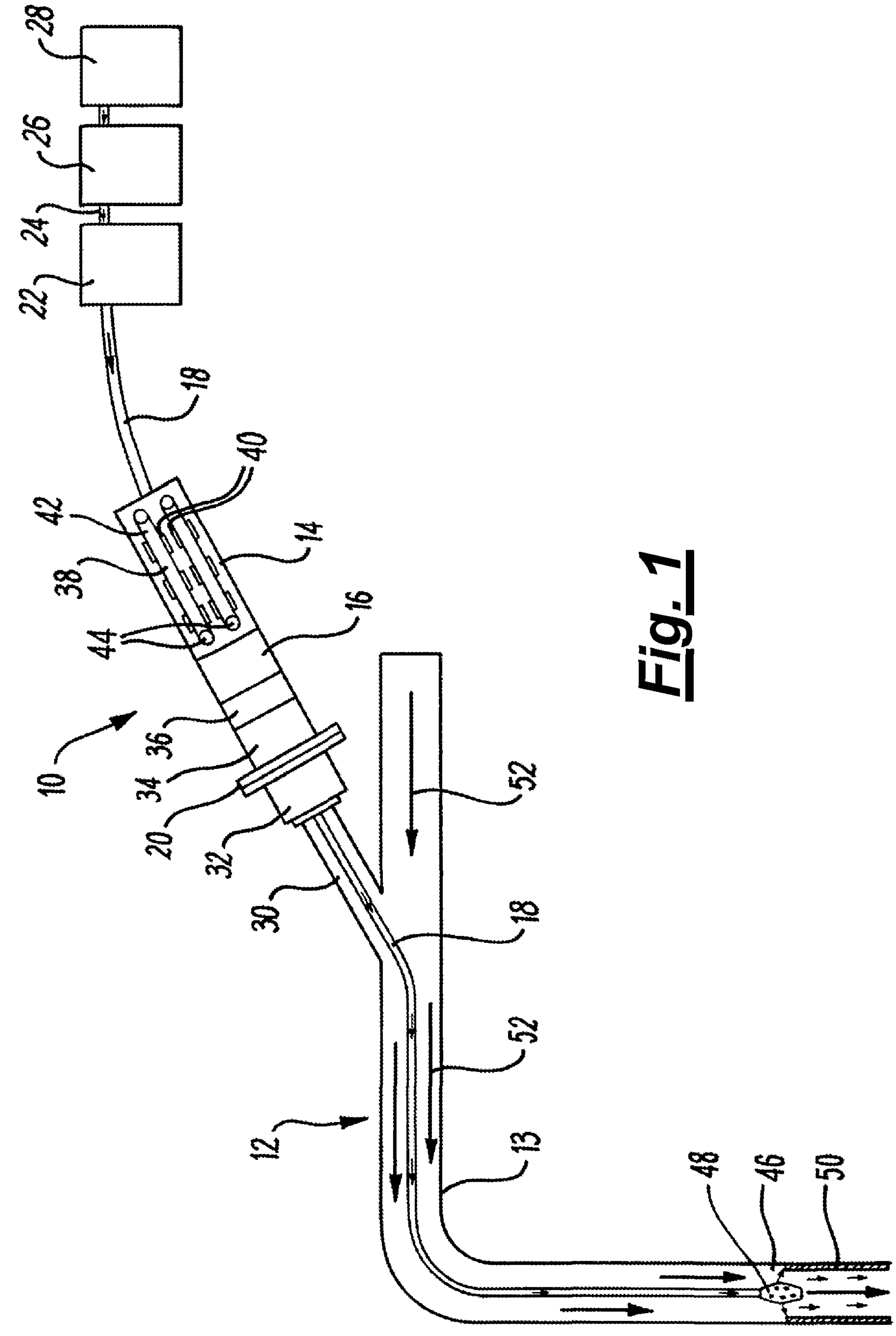
FIG. 1 is a schematic view of an apparatus in accordance with an embodiment of the invention coupled to a conduit system.

Referring firstly to FIG. 1, there is shown schematically a cleaning apparatus, generally depicted at 10, coupled to a fluid conduit system 12. The fluid conduit system 12 in this case comprises a produced water flowline 13 on a hydrocarbon production installation.

The apparatus 10 comprises a feeding module 14 and a pressure control assembly, generally shown at 15, comprising a valve arrangement 16, a stripper 36, and a housing 34. The apparatus 10 defines an internal bore (not shown), for receiving a flexible hose 18. The flexible hose 18 is deployed from a hose storage reel 22 on which it is wound, and may be several tens or indeed many hundreds of metres in length. A proximal end 24 of the hose 18 is connected to a diesel jetting pump 26, which pumps cleaning fluid from a tank 28.

The flexible hose 18 is selected to have sufficient flexibility to allow it to pass through a wide range of conduit systems. However, the hose must also be robust enough to withstand forces experienced in normal use and have a pressure rating sufficient for use in a high pressure jetting system, which may for example operate at between 10 kpsi (or 69,000 KPa) and 20 kpsi (or 138,000 KPa). The hose 18 must also have sufficient crush resistance to allow it to be passed through the stripper 36. The flexible hose is in this embodiment a composite hose comprising a plastic inner core formed from polyamide surrounded by a number of braided steel wire layers. An outer plastic layer of polyamide surrounds the braided wire layers. The braided layers function to provide crush resistance from the forces experienced by the stripper and/or the feeding module, and the inner plastic core in conjunction with the braided layers provides the hose with high pressure capability. The outer plastic layer provides the hose with the smoothness required to mitigate frictional forces experienced as the hose is run into the fluid conduit. One example of a suitable hose is the 2240N-16V30 ultra high pressure hose marketed by Hydrasun Ltd. This hose has an outer diameter of 37 mm, an inner diameter of 25 mm, and a minimum bend radius to 300 mm, which is a good combination of pressure handling, flow volume, stiffness and flexibility, and crush resistance for the applications envisaged. It will be appreciated that other flexible hoses may be used within the scope of the invention.

The apparatus 10 comprises a coupling 20 for connecting the apparatus to an opening of the fluid conduit system 12. In this case, the opening is defined by a side branch 30 to the main produced water flowline 13. The side branch 30 is located at an acute angle to a straight section of the flowline 13, although other embodiments may have openings at different locations on the flowline and with different orientations. An isolation valve 32 is located at the opening of the side branch 30, to retain fluid pressure within the conduit system 12. The apparatus 10 couples to the fluid conduit system above the isolation valve.

The side branch is just one example of a suitable inlet to a fluid conduit system 12. Conveniently, the side branch may be fitted to the fluid conduit system during a shutdown period. Such shutdown periods occur at intervals (for example for conventional maintenance purposes), and the side branch or another inlet type may be fitted to the conduit system during this time. The isolation valve 32 will be closed before the flow is reintroduced to the produced water flowline 13.

The valve arrangement 16 comprises a blowout preventer (not shown) which provides an additional safety mechanism. The blowout preventer 16 is a shear and seal blowout preventer, which has the capability to cut or otherwise sever a cleaning flowline introduced to the fluid conduit system 12 via the apparatus. This embodiment also comprises a chamber 34 which functions as a lubricator, providing an access chamber for coupling devices such as nozzles to the distal end of the hose, as will be described below.

Optionally a divertor (not shown) may be provided to create a fluid outlet for fluid in the annulus between the introduced flowline and the inner surface of the side branch to the fluid conduit system.

The stripper 36 comprises internal pack off elements which define a portion of the internal bore through the apparatus 10. The pack-off elements are formed from an elastomeric material, arranged to provide a fluid seal with the outer surface of a flowline passing through the apparatus. The pack-off elements are operable to be actuated against the outer surface of the flowline, and in this case are actuated by introducing hydraulic pressure into a chamber outside of the pack off elements. In other embodiments, the pack off elements may be mechanically actuated. The stripper 36 allows a flowline such as a flexible hose 18 to pass through the apparatus while retaining pressure in the conduit system beneath the stripper.

Figure 2A:
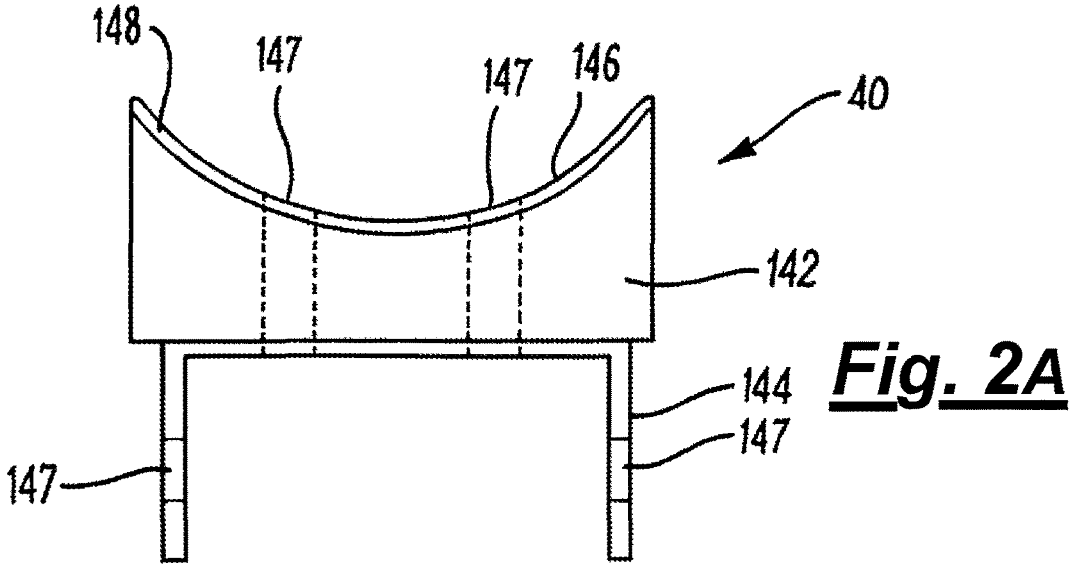
FIGS. 2A to 2C are schematic views of blocks used with the apparatus of FIG. 1, with from end, plan and side views respectively.
Figure 2B:
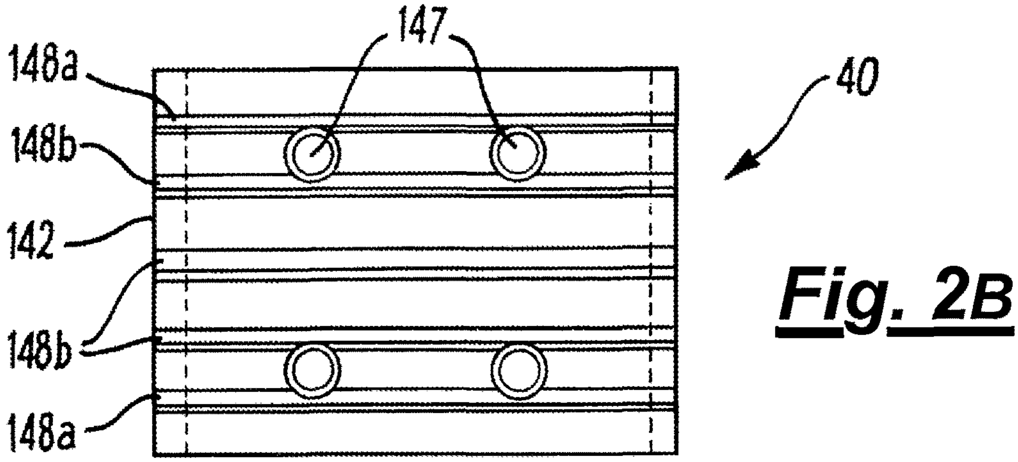
Figure 2C:
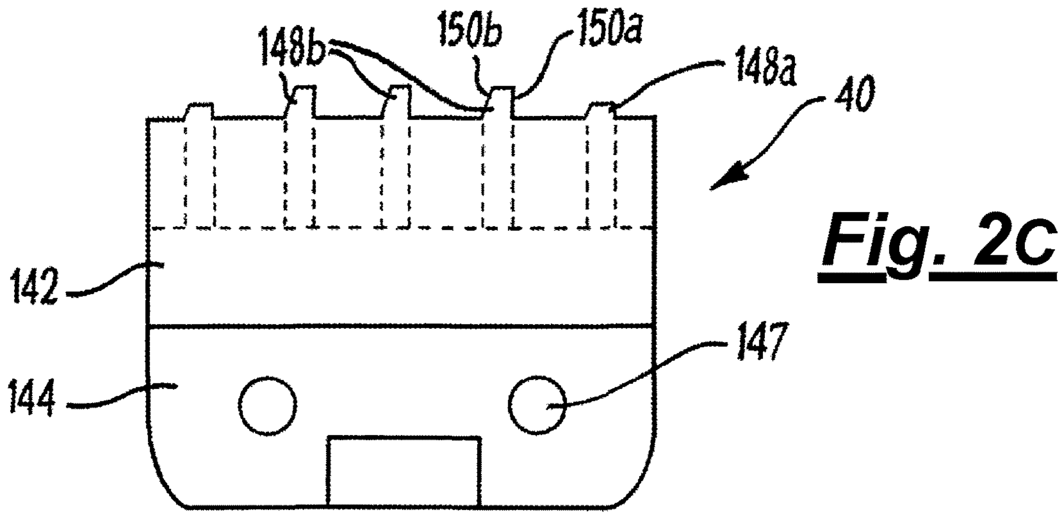

The feeding module 14 comprises a drive mechanism 38 for pushing and pulling the hose 18 into and out of the fluid conduit system through the pressure control apparatus. The drive mechanism 38 comprises an arrangement of blocks 40 disposed on chains 42 driven by cogs 44. The blocks 40 are shown in FIGS. 2A to 2C, and comprise a body 142 mounted to a carrier 144, which in turn is mounted to the chain 42 in use. The body 142 has a concave upper surface 146 having a cross sectional profile which describes a part of a circle. Apertures 147 are provided in the surface 146 and the side walls of the carrier 144.

Engaging teeth are provided in the form of ridges 148*a*, 148*b* (together 148) which are raised from the surface 146 and separated in the longitudinal direction L of the block (and the flexible hose). The ridges 148 extend across the body from one side to the other. The ridges 148 are configured to contact and engage with the flexible hose to allow it to be pushed into or pulled out of the fluid conduit. Each ridge has a profile which is directional; one edge 150*a* of the ridge 146 extends perpendicularly from the surface 146 and one edge 150*b* is slightly angled from the perpendicular. The edge 150*a* tends to engage or bite into the outer shell of the flexible hose to provide a pushing force onto the hose during deployment.

The chain blocks 40 are shaped and sized to engage with the outer surface of the flexible hose by forming an indentation in the outer surface to a depth of 1 mm or less. This sufficient engagement with the flexible hose to inject or retract is, but does not penetrate the outer wall of the hose.

In this embodiment, five ridges 148 are provided on each block (although it will be appreciated that fewer or more may be provided in other embodiments). The outer ridges 148*a* are formed to a first height above the surface 146, and the three inner ridges 148*b* are formed to a second, greater height above the surface 146. This configuration causes the block 40 to engage with the hose more securely at the central area of the block, so that the majority of the force is driven through the central contact area.

The feeding module 14 must be capable of pushing in the hose against the resistance of fluid pressure in the fluid conduit system, frictional contact between the hose and the inside surface of the conduit system, as well as the resistance presented by the pressure control device. The feeding module 14 must additionally be capable of withdrawing the hose from the fluid conduit system against the weight of the length of hose which has been deployed. In this embodiment, the feeding module 14 is capable of applying a pushing and/or pulling force equivalent to around 250 kg of weight. Feeding modules with other push/pull capacities may be used in other embodiments, although the power of the feeding modules tends to increase the size and weight of the equipment, and therefore an appropriate compromise between power and size is necessary.

The feeding module 14 is also equipped to carry out "pull tests" during deployment of the hose 18. At regular intervals during deployment of the length of hose 18, pumping of fluid through the hose 18 is interrupted. The feeding module 14 pulls back on the hose by reversing the direction of the drive mechanism and measures the force required to withdraw the hose a short length from the conduit system 12. If the force required exceeds a preset threshold (which approaches the maximum pull force achievable by the feeding module) then a warning may be provided to an operator to indicate that the hose is approaching its maximum deployment length, and or that there is a possibility that the hose is becoming stuck.

Assembly of the apparatus is as follows. The hose 18 is inserted into the feeding module 14 and fed through the stripper 36 before the pack off elements within the stripper are actuated. When the distal end 46 of the hose has been passed through the pressure control equipment, an appropriate nozzle 48 can be fitted to the end 46 in the access chamber 34. Suitable nozzles include rotating nozzles such as those marketed under the BJV trade mark by StoneAge, Inc. of Colorado, United States. In this embodiment the nozzle is suitable for applications in excess of 10,000 psi (or 69,000 KPa), and can handle flow rates up to 120 gallons (546 litres) per minute. The nozzle 48 is configurable to adjust and direct its jets according to the operation and the application conditions. Nozzle rotation speed is also configurable. Typical nozzle configurations used in the cleaning operations are not capable of being passed through the stripper. The nozzle is however able to pass through the bore defined by the chamber 34, coupling 20 and isolation valve 32. The nozzle 48 can therefore be attached to the hose 18 beneath the blow out preventer 16 and the stripper 36 and can subsequently be withdrawn into the chamber 34 before the apparatus 10 is attached to the conduit system 12. With the nozzle 48 in the chamber 34, the stripper is actuated to pack off around the hose 18.

With the hose 18 fed through and sealed by the stripper 36, the apparatus 10 is coupled to the fluid conduit system by the coupling 20. The isolation valve 32 is opened to expose the hose and the bore defined by the lower parts of the apparatus 10 to the pressure of the conduit. It is an important feature of aspects of the invention that the apparatus allows the hose to be introduced into the pipeline system while the produced water is flowing. The hose 18 is then deployed by injecting the hose through the stripper 36 and further into the fluid conduit system 12. Cleaning fluid, such as water, is pumped at high pressure (for example in the range of 10 kpsi to 20 kpsi (or 69,000 KPa to 138,000 KPa)) through the internal bore of the hose 18 (and therefore through the apparatus 10) into the hose and out through the nozzle 48.

The physical jetting force provided by the high pressure fluid exiting the nozzle at high velocity removes layers 50 of scale, debris and accumulated matter from the inside surface of the flowline 13, so that it enters the main flow stream 52 in the conduit. The debris is carried in the flow stream 52 and out of the fluid conduit outlet (not shown). If necessary, a filtration system (which may be a simple fluid strainer) may be used to catch debris from the out-flowing fluid. The fluid may be stored in a tank, treated, reinjected or discarded. The flow of fluid in the conduit creates a drag force on the flexible hose 18 and the nozzle 48, and assists with the deployment of the hose into the conduit system. The jetting force may have a rearward facing component, in which case it may also assist in deploying the flexible hose. The drag force and/or jetting force (where present) provides or maintains a degree of tension in the flexible hose sufficient to prevent lock-up of the hose during deployment.

Figure 3A:
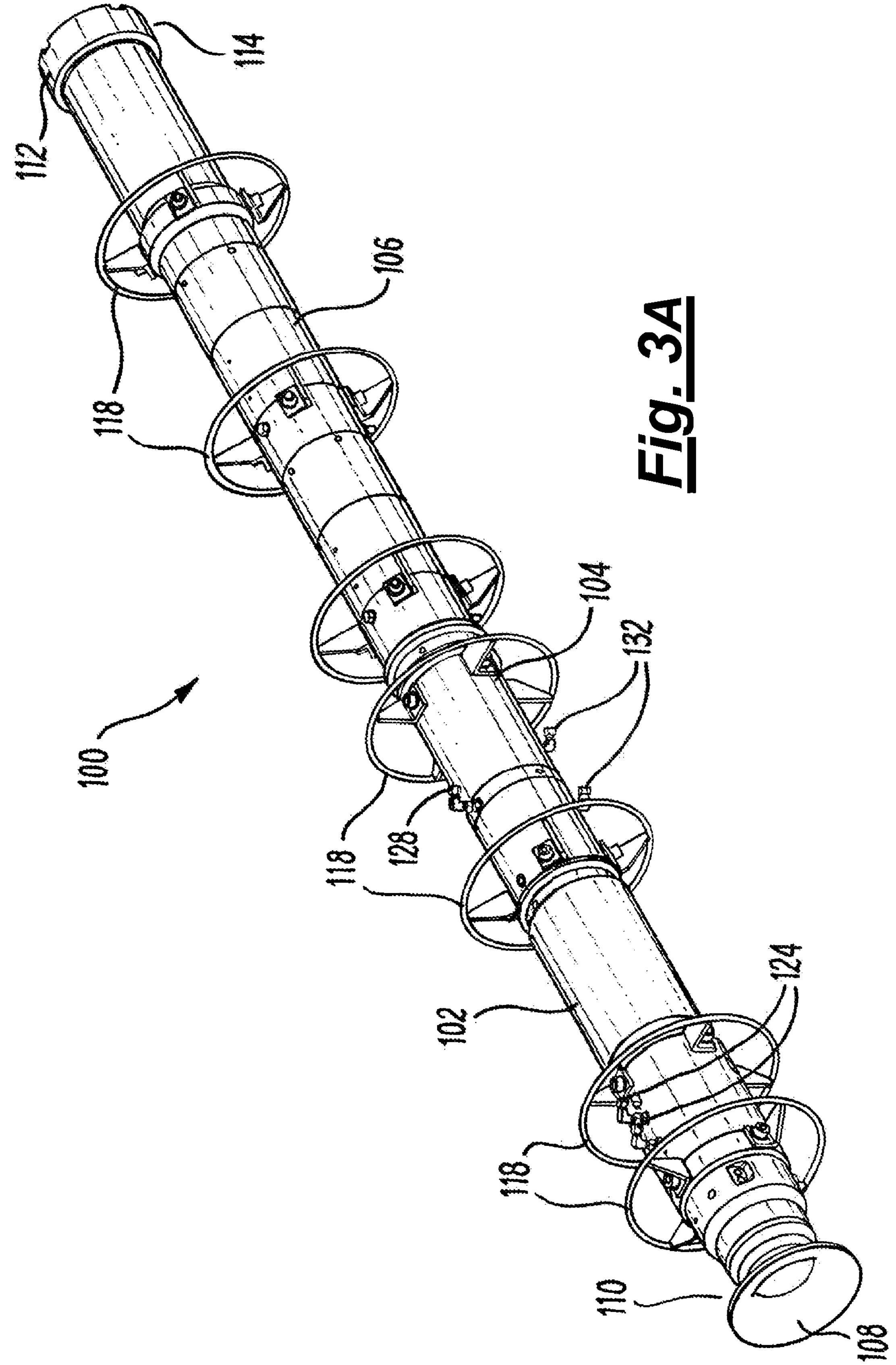
FIGS. 3A to 3C are respectively isometric, side, and sectional views of a pressure control assembly in accordance with a preferred embodiment of the invention.
Figure 3B:
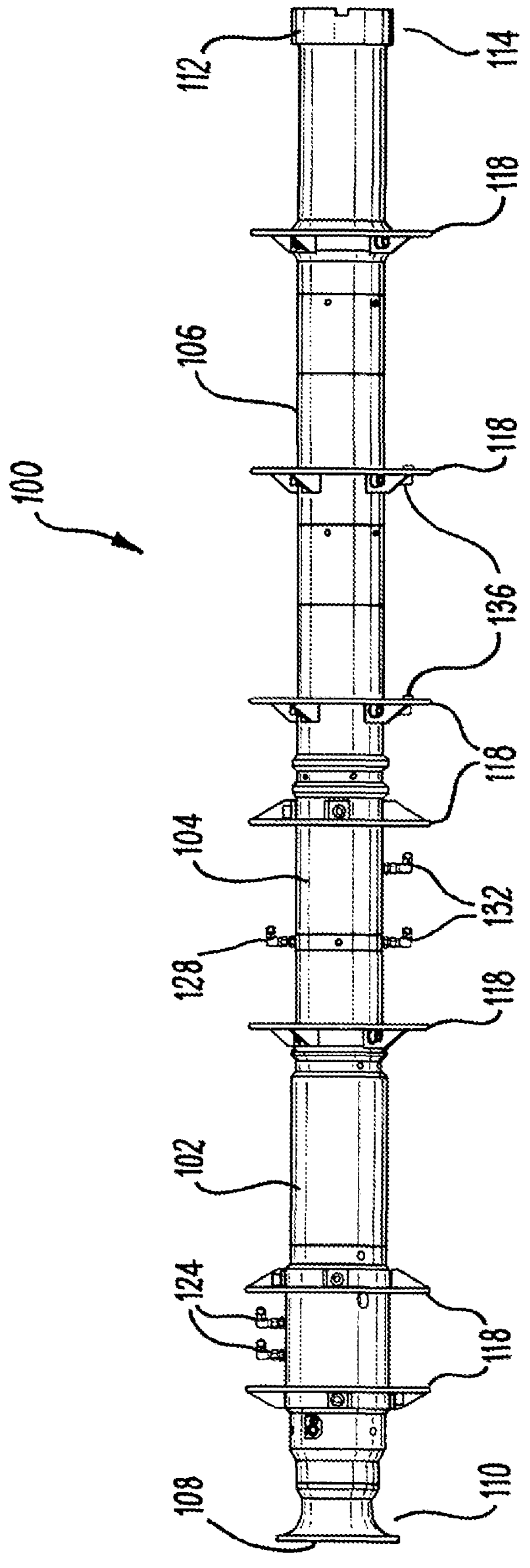
Figure 3C:
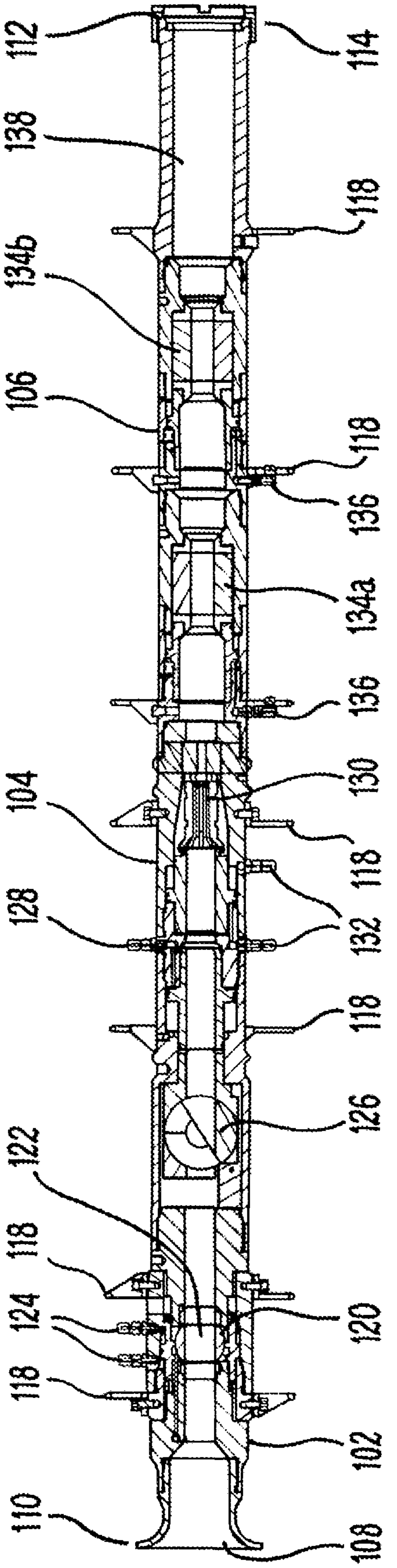

There will now be described a preferred embodiment of the invention, with reference to FIGS. 3A to 3C and 4. FIGS. 3A to 3C are respectively isometric, side, and sectional views of a pressure control assembly, generally shown at 100. The pressure control assembly 100 comprises a plurality of cylindrical housings connected together to form a substantially cylindrical structure having an opening 108 at a first end 110, and a coupling 112 at a second end 114. A continuous throughbore is defined through the assembly 100. The coupling 112 is configured for attachment to a fluid conduit system, and the opening 108 is configured to receive a flexible hose from a feeding module (as will be described below). The assembly 100 comprises a valve sub assembly 102 at the first end 110; a pack-off sub assembly 106 at a second end 114; and a gripper and cutter sub assembly 104 disposed between the valve sub assembly 102 and the pack-off sub assembly 106. The housings of the respective sub assemblies are threaded together. Bearing frames are provided on the exterior of the assembly 100, and comprise circular support rings 118 which extend radially from the housings and rest in bearing recesses (not shown). The support rings 118 are rotatable in the bearing recesses to permit threading and unthreading of the housings and access to the internal components.

The valve sub assembly 102 comprises a hydraulically actuated ball valve 120 which closes a valve throughbore 122 to seal against fluid pressure in the housing. Hydraulic lines 124 are connected to hydraulic control equipment (not shown). The function of the ball valve 120 is to provide a complete fluid seal in the event of a loss of pressure control in the assembly 100 and fluid conduit.

The gripper and cutter sub assembly 104 comprises a cutter unit 126 which is hydraulically actuable by line 128 to sever the flexible hose in the event of a well control event. In this embodiment, the cutter unit 126 is a rotary cutter to maintain a small outer diameter of the assembly, although in other embodiments a radial shear ram cutter arrangement may be used. Below the cutter unit 126 (in the direction of deployment of the hose from left to right in the orientation of FIGS. 3 and 4) is gripper unit 130 which is actuable by hydraulic lines 132 to grip a flexible hose passing through the throughbore. In use, the gripper unit 130 is actuated before of simultaneously with the cutter unit to prevent the cut flexible hose and its nozzle from being lost into the fluid conduit. A proximal portion of the flexible hose may be withdrawn from the assembly 100 to allow the ball valve 120 to close and seal the assembly.

The pack-off sub assembly 106 provides pressure control during normal operation of the equipment. The pack-off assembly 106 comprises first and second stripping elements 134*a*, 134*b* (together 134), which are hydraulically actuated by lines 136 to seal against a flexible hose passing through the bore. The stripping elements are actuated together to provide a fully backed up seal against pressure in the fluid conduit.

At the lower end 112 of the assembly 100, disposed between the coupling 114 and the stripping elements 134, is chamber 138. The chamber 138 has sufficient length and inner diameter to accommodate a nozzle assembly, which typically will be fitted to the distal end of the flexible hose after it has passed through the stripping elements 134. The nozzle assembly will be accommodated in the chamber 138 allowing the coupling to be attached to the fluid conduit system.

Figure 4:
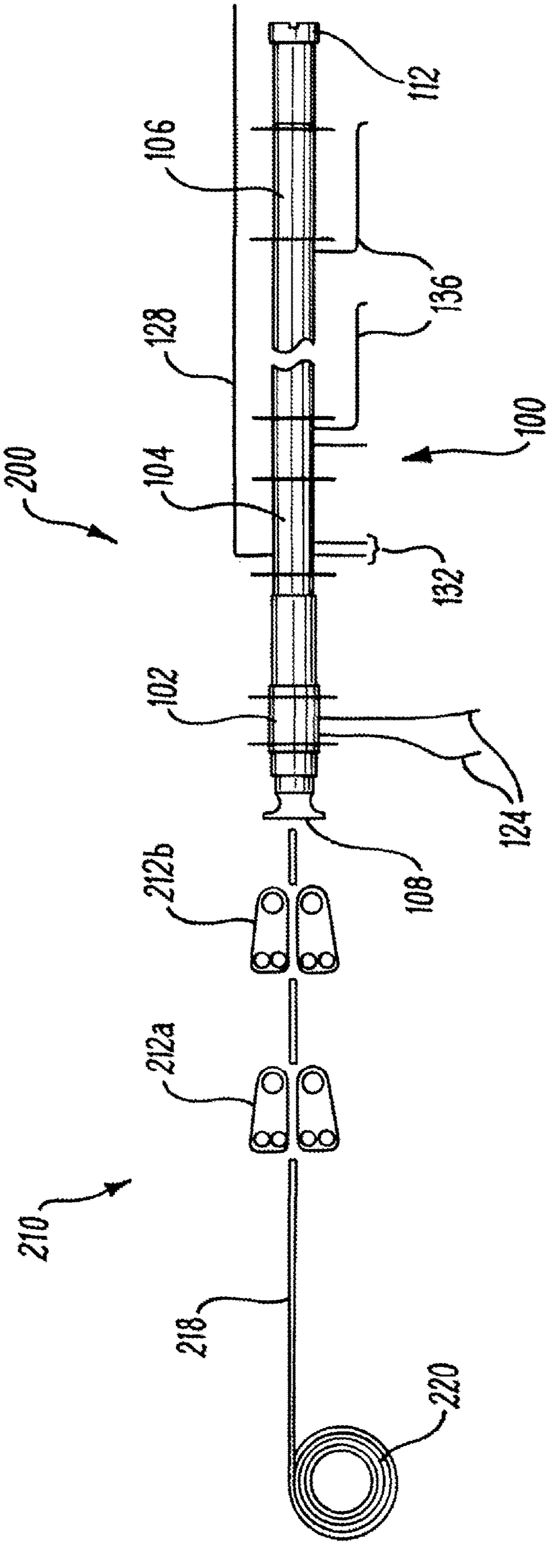
FIG. 4 is a schematic view of an apparatus comprising the assembly of FIGS. 3A to 3C and feeding modules in accordance with a preferred embodiment of the invention.

FIG. 4 is a schematic representation of an apparatus 200 according to an embodiment of the invention, incorporating the pressure control assembly 100 of FIGS. 3A to 3C; a flexible hose 218; and a modular system 210 for feeding the flexible hose through the pressure control assembly 100. The hose is deployed from a storage reel 220, which includes a retraction mechanism to wind in any slack on the hose. The modular system 210 comprises a first and second feeding modules 212*a*, 212*b* (together 212), each of which is arranged to impart a pushing and/or pulling force on the flexible hose 218. Each feeding module 212 is a portable unit, with the operable components of the module mounted on a wheeled frame (not shown). In this embodiment, the first and second feeding modules 212*a*, 212*b* may selectively be used in series to increase the maximum pushing and/or pulling force on the flexible hose for applications in which this is necessary or desirable. Such applications include marine risers, which may require a deployment depth of around 200 m, and may be at pressure of the order of 15 bar (1,500 KPa). Under these conditions, forces on the flexible hose from the fluids in the conduit exceed the weight of the flexible hose (referred to as "pipe light" conditions) and the feeding modules are required to overcome the forces which tend to push the flexible hose out of the conduit.

Operating a pair of feeding modules 212 in series allows increased depth of deployment; use in higher pressure fluid systems; and greater integrity of seal of the elements in the pressure control module (by higher pressure stripping). The increased maximum push and/or pull force allows deployment of flexible hoses (and/or nozzles) of different types which have a greater resistance to deployment into the fluid conduit system. Alternatively, the first and second feeding modules may be used to impart the same magnitude of pushing and/or pulling force on a flexible hose for a lower radial/engaging force on the hose, which may facilitate using hose types with even greater flexibility, but with less robust outer walls or reduced radial compressive strength.

It is an advantage of this aspect of the invention that the above-described benefits may be selectively obtained by operating the system with the first and second feeding modules in series when the application makes this necessary or desirable. However, for those applications which only require a single feeding module, one module can be used in isolation. This reduces the overall size, weight and footprint of the system. Furthermore, the flexible hoses are typically worn from the engaging action of the drive mechanism over repeated use, and it is therefore desirable to use only the pushing and pulling forces necessary for the operation to avoid excess wear on the hose.

The portability of the feeding modules 212 allows them to be moved around the fluid conduit site if not required for a given operation, and quickly brought to the site if multiple units are required.

In the embodiment of FIG. 4, each feeding module 212 has a single feeder unit, comprising a drive mechanism as described with reference to FIGS. 1 and 2. One or more of the feeding modules may comprise a plurality of feeding units, and in a preferred embodiment, each feeding module comprises a pair feeding units that may be selectively operated. Such an embodiment has particular flexibility, and may be customised to provide a pushing and pulling force suitable for a particular operation.

Figure 5:
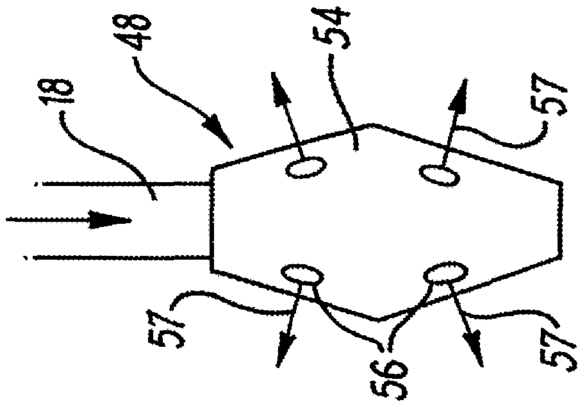
FIG. 5 is a side view of a nozzle according to an embodiment of the invention.

A number of different nozzle types may be used with different embodiments of the present invention, and examples are shown in FIGS. 5 to 8. FIG. 5 is a side view of a nozzle 48 (identical to the nozzle shown in FIG. 1) coupled to a flexible hose 18. The nozzle comprises a nozzle body 54 with a chamfered profile. Circumferentially spaced outlets 56 on the nozzle are directed substantially radially of the longitudinal axis of the nozzle and hose, with small rearward or forward components to the direction of jets 57.

Figure 6:
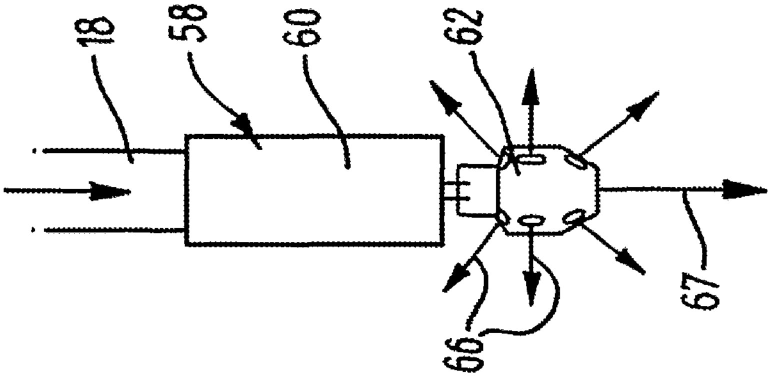
FIG. 6 is a side view of a nozzle according to an alternative embodiment of the invention.

FIG. 6 shows an alternative nozzle 58. The nozzle is attached to the flexible hose 18 and comprises a fixed body portion 60 and a forward portion 62. The forward body portion 62 comprises a number of outlets 64 which create fluid jets 66 with radial components. In addition, a forward jet 67 is provided. The forward portion 62 of the nozzle 58 is configured to rotate while fluid is pumped through the nozzle 58. This helps increase the coverage of the jets during the cleaning operation.

Figure 7:
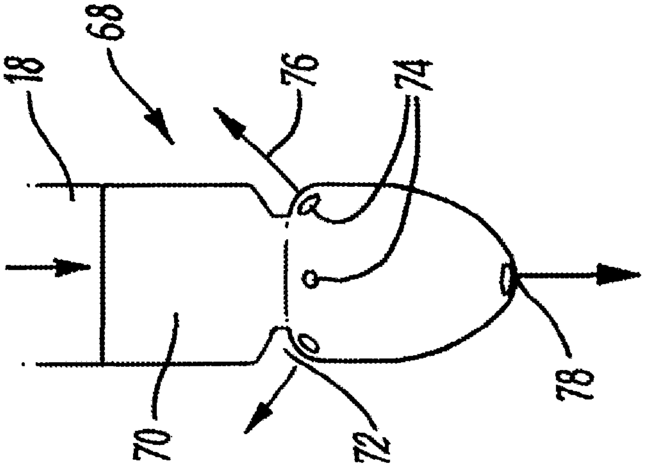
FIG. 7 is a side view of a nozzle according to a further alternative embodiment of the invention.

FIG. 7 shows a further alternative nozzle 68 attached to a hose 18. The nozzle comprises a fixed body portion 70 and includes an annular recess 72 located on the body. The annular recess 72 is provided with circumferentially spaced outlets 74 which provide rearward facing jets 76. A forward outlet 78 is also provided to direct a proportion of the flow in a forward direction.

Figure 8A:
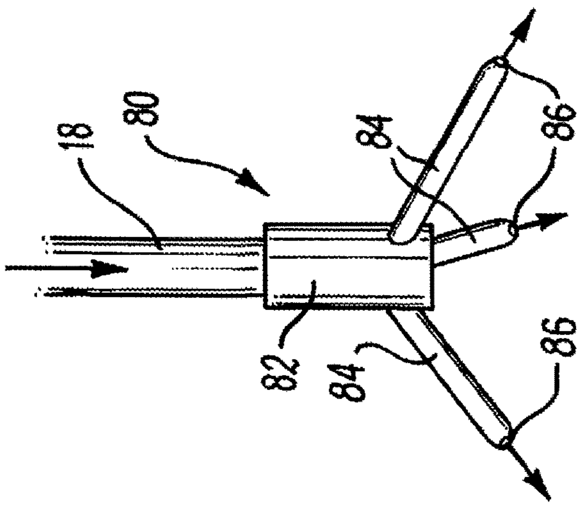
FIG. 8A is a perspective view of a nozzle with nozzle extension portions, according to an alternative embodiment of the invention.
Figure 8B:
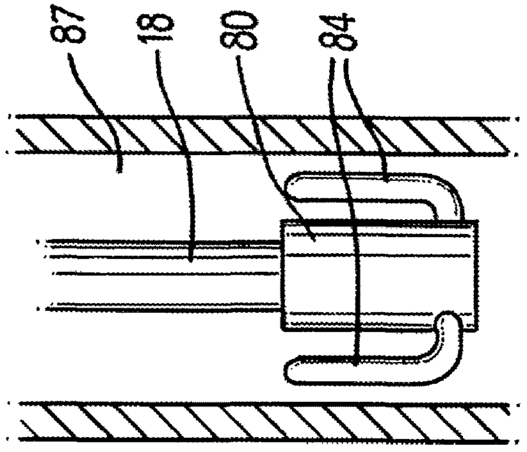
FIGS. 8B and 8C are schematic views showing the nozzle of FIG. 8A in use.
Figure 8C:
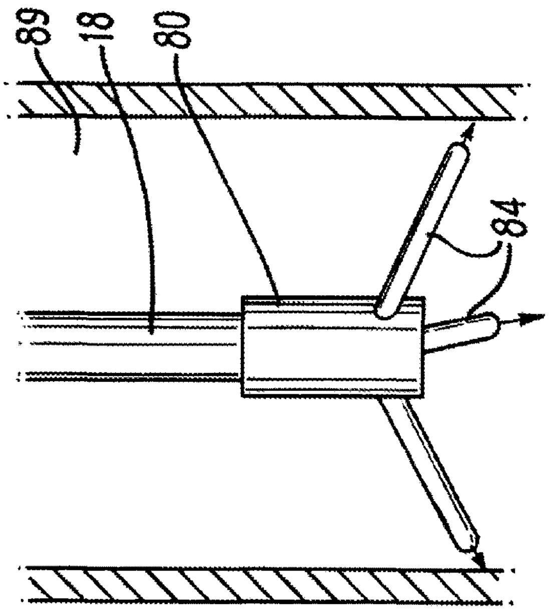

The invention is applied to conduits with flow streams, in contrast with conventional cleaning operations which are used in open, dry fluid conduits. The flowing fluid tends to disperse the force of the jets of cleaning fluid expelled from the nozzle. This may impact on the efficiency of the cleaning operation, particularly in fast flowing streams. This problem can be mitigated by increasing the fluid pressure of the cleaning fluid such that the jets penetrate through the flowing stream to impact on the scale or debris on the inside surface of the conduit. Alternatively, the problem may be addressed by simply using a larger diameter flexible hose and/or nozzle such that the outlets of the nozzle are located closer to the inside surface of the conduit. However, these approaches may not be practical in all circumstances. For example, the pressure capability may be limited. Also, in the system depicted in FIG. 1, the nozzle is required to pass through a side branch which is of smaller inner diameter than the main fluid conduit. Embodiments of the invention address this problem by providing a radially expandable nozzle. FIGS. 8A to 8C show a further alternative nozzle configuration which may be used in some embodiments of the invention. This nozzle, shown generally at 80, has an increased radial dimension and is therefore capable of placing the outlets of the nozzle closer to the inside surface of a large bore conduit.

The nozzle 80 comprises a main body 82 and nozzle extension portions 84 located on the body. The nozzle extension portions 84 comprise internal bores which are in fluid communication with the main bore of the hose 18 and outlets 86. The nozzle extension portions 84 extend radially of the longitudinal axis of the hose and the main body 82 of the nozzle. In this embodiment, the nozzle extension portions are formed from a flexible material, and can therefore bend or flex.

FIG. 8B shows the nozzle 78 in position in a narrow bore 87, which may be for example the internal bore defined by the apparatus 10 beneath the stripper, or may be a bore defined by a part of the fluid conduit system 12 itself. The nozzle extension portions 84 are flexed so that they lie substantially parallel to the longitudinal axis and against the main body of the nozzle. Note that in this drawing the nozzle extension proportions face rearward, although in other configurations it is equally possible for the nozzle extension portions to flex forward such that they extend beyond the distal end of the nozzle. In this flexed or retracted configuration, the nozzle may pass through narrow bore restrictions or portions of the fluid conduit system.

FIG. 8C shows the nozzle in a large bore conduit 89, which may be the produced water flow line 13 in the system shown in FIG. 1. The nozzle extension portions 84 are in a radially expanded position which places the fluid outlets 86 defined in the ends of the nozzle extension portions radially closer to the inside surface of the conduit. Deployment of the nozzle extension portions from a retracted to an expanded position may be facilitated by the fluid pressure of the cleaning fluid being pumped through the hose and nozzle.

Although the above-described embodiment includes nozzle extension portions formed from the flexible material, other embodiments may include nozzle extension portions which are rigid. In such embodiments, the nozzle extension portions may for example include a hinge or pivot which allows it to be moved from a retracted to an extended position.

By using a nozzle with an expandable radial portion, it may also effectively maintain the nozzle outlets in position against accumulated layer being cleaned in the fluid conduit. As the layers of material are removed from the inside surface, the nozzle extension portions are further deployed radially to maintain contact with the inner surface.

In the above-described embodiment, three nozzle extension portions are provided circumferentially spaced on the body. However, it will be understood that any number of nozzle extension portions may be located on the body.

The invention provides a method of cleaning a fluid conduit in a hydrocarbon production installation. The method comprises introducing a flexible hose into a fluid conduit system through a pressure control device, and running the flexible hose into a conduit to be cleaned while a fluid stream flows in the conduit. At least one substance is cleaned from the conduit by pumping a cleaning fluid into a bore of the flexible hose and expelling the cleaning fluid from the flexible hose into the conduit through at least one outlet in the flexible hose. The substance is carried the at least one substance in the fluid stream to a conduit outlet.

Applications of the invention include the cleaning of produced fluid conduits (including overboard water caissons), marine risers (including production risers), closed drains, heat exchange systems and process pipe work (including from the riser to the separator, or between a flare stack and an export pump), while fluid is flowing in the conduits. The invention can be deployed against the flow direction or with the flow direction. The invention has application across a range of fluid conduit sizes, fluid flow rates, and pressures. The invention may be used as a primary cleaning method or as a complementary tool to cleaning methods such as pigging.

Various modifications may be made to the above-described embodiments within the scope of the invention. For example, although the apparatus is shown in a linear configuration in the drawings, the flexibility of the hose allows alternative orientations of the apparatus. For example, components of the system may be inclined with respect to one another to reduce the footprint of the apparatus. For example, an angled connection may be provided between the stripper and the chamber, with a suitable guide path for the flexible hose. In another embodiment, the drive mechanism of a feeding unit comprises contact surfaces on wheel-driven belts. The belts provide a smooth contact surface which has a degree of compliance. This surface contacts the outer surface of the hose, with rotation of the wheels driving the belts to push or pull the hose through the apparatus and into or out of the conduit system. The invention extends to combinations of features other than those expressly claimed herein.

The present invention provides an improved method and apparatus for cleaning the inside of fluid conduit systems which has application to a wide range of fluid conduit systems used in the hydrocarbon exploration production industry.

Clauses

1. A method of cleaning a fluid conduit in a hydrocarbon production installation, the method comprising:

providing a feeding module for a flexible hose, the feeder module configured to engage an outer wall of the flexible hose and impart a pushing and/or pulling force on the flexible hose;

introducing the flexible hose into the fluid conduit system through a pressure control device;

running a first end of the flexible hose into a conduit to be cleaned while a fluid stream flows in the conduit;

cleaning at least one substance from the conduit by pumping a cleaning fluid into a bore of the flexible hose and expelling the cleaning fluid from the flexible hose into the conduit through at least one outlet in the flexible hose; and carrying the at least one substance in the fluid stream to a conduit outlet.

2. The method of clause 1, comprising forcibly displacing the at least one substance from the conduit by jetting of the cleaning fluid from the hose.

3. The method of clause 1 or clause 2, comprising engaging an outer wall of a flexible hose by indenting the wall of the flexible hose 4. The method of any preceding clause, comprising deploying the hose into the conduit at least in part using drag force imparted by the fluid stream.

5. The method of any preceding clause, comprising pumping fluid during deployment of the hose, and deploying the hose at least in part using a fluid jetting force from fluid expelled from the hose.

6. The method of any preceding clause, comprising retracting the hose from the fluid conduit while the fluid stream flows in the conduit.

7. The method of any preceding clause, comprising passing a distal end of the hose through the pressure control device and subsequently attaching a nozzle to the hose.

8. The method of any preceding clause, comprising expanding a nozzle extension portion from a first retracted position to a second expanded position.

9. An apparatus for cleaning a fluid conduit in a hydrocarbon production installation, the apparatus comprising:

a flexible hose comprising a bore and at least one outlet;

a pressure control device;

a coupling for an opening of a fluid conduit system;

at least one feeding module for engaging the flexible hose and imparting a pushing and/or pulling force on the flexible hose to introduce it through the pressure control device and into or out of the fluid conduit system; and a pump configured to pump a cleaning fluid into the bore of the flexible hose and expel the cleaning fluid into the conduit through the at least one outlet in the flexible hose.

10. The apparatus of clause 9, wherein the flexible hose is a composite hose comprising at least one plastic layer and at least one metal layer.

11. The apparatus of clause 9 or clause 10, wherein the hose has an inner diameter in the range of 5 mm to 60 mm.

12. The apparatus of clause 11, wherein the flexible hose has an inner diameter of approximately 20 mm to 60 mm.

13. The apparatus of any of clauses 9 to 12, wherein the flexible hose has a minimum elastic bending radius of less than 40 times the inner diameter of the hose.

14. The apparatus of clause 13, wherein the hose has a minimum elastic bend radius of approximately 12 times the inner diameter of the hose.

15. The apparatus of any of clauses 9 to 14, comprising a nozzle configured to produce a rearward fluid jet which provides a propulsive force on the hose.

16. The apparatus of clause 15, further comprising a drive mechanism, wherein the drive mechanism is configured to engage with the outer surface of the flexible hose by forming indentations in the outer surface of the hose.

17. The apparatus of clause 16, wherein the indentations are formed to a depth of less than 1 mm.

18. The apparatus of clause 16 or clause 17, wherein the drive mechanism comprises at least one chain and one or more chain blocks.

19. The apparatus of clause 18, wherein the chain blocks comprise a concave surface which is part-circular in profile.

20. The apparatus of clause 18 or clause 19, wherein chain blocks comprise teeth or ridges, and the teeth or ridges are shaped to provide a directional engagement with the flexible hose.

21. The apparatus of any of clauses 18 to 20, wherein the chain blocks comprise teeth or ridges, and the teeth or ridges are formed to different heights.

22. The apparatus of clause 21, wherein teeth or ridges disposed at or around the longitudinal centre of the block are higher than teeth or ridges disposed further away from the longitudinal centre of the block.

23. The apparatus of any of clauses 9 to 22, wherein the feeding module is capable of applying a pushing force or a pulling force equivalent to a weight greater than 100 kg.

24. The apparatus of clause 23, wherein the feeding module is capable of applying a pushing force or a pulling force equivalent to a weight greater than 300 kg.

25. The apparatus of any of clauses 9 to 24, wherein the feeding module comprises a plurality of feeding units, each feeding unit comprising a drive mechanism.

26. The apparatus of any of clauses 9 to 25, wherein the apparatus comprises a chamber located between the pressure control device and an opening for coupling to a fluid conduit system, and the chamber provides access to the flexible hose at a location below the pressure control device.

27. The apparatus of any of clauses 9 to 26 further comprising a blowout preventer.

28. The apparatus of any of clauses 9 to 27, further comprising a cutting device configured to cut, shear, or sever the flexible hose.

29. The apparatus of any of clauses 9 to 28, further comprising a gripping mechanism arranged to retain a portion of the flexible hose in the apparatus.

30. The apparatus of any of clauses 9 to 29, wherein the pressure control device comprises one or more stripping elements.

31. A modular system for cleaning a fluid conduit in a hydrocarbon production installation, the modular system comprising:

a pressure control module configured to be coupled to an opening of a fluid conduit system;

a first feeding module for imparting a pushing and/or pulling force on a flexible hose to introduce it through the pressure control module into or out of the fluid conduit system; and a second feeding module for imparting a pushing and/or pulling force on the flexible hose to introduce it through the pressure control module into or out of the fluid conduit system.

32. The modular system of clause 31, wherein the first and second feeding modules are configured to be used together to impart a pushing and/or pulling force on a flexible hose.

33. The modular system of clause 31 or clause 32, wherein one or more of the feeding modules is portable.

34. The modular system of clause 33, wherein one or more of the feeding modules comprises a frame or chassis mounted on wheels or rollers.

35. The modular system of clauses 31 to 34, wherein one or more of the feeding modules comprises a plurality of feeding units.

36. The modular system of clause 35, wherein each feeding unit comprises a drive mechanism for a flexible hose.

37. The modular system of clause 36, wherein the drive mechanism is configured to engage with the outer surface of the flexible hose by forming indentations in the outer surface of the hose.

38. The modular system of clause 37, wherein the indentations are formed to a depth of less than 1 mm.

39. The modular system of any of clauses 36 to 38, wherein the drive mechanism comprises at least one chain and one or more chain blocks.

40. The modular system of clause 39, wherein the chain blocks comprise a concave surface which is part-circular in profile.

41. The modular system of clause 39 or clause 40, wherein chain blocks comprise teeth or ridges, and the teeth or ridges are shaped to provide a directional engagement with the flexible hose.

42. The modular system of clause 40 or clause 41, wherein chain blocks comprise teeth or ridges, and the teeth or ridges are formed to different heights.

43. The modular system of clause 42, wherein teeth or ridges disposed at or around the longitudinal centre of the block are higher than teeth or ridges disposed further away from the longitudinal centre of the block.

44. The modular system of any of clauses 31 to 43, wherein at least one of the first and second feeding modules is capable of applying a pushing force or a pulling force equivalent to a weight greater than 100 kg.

45. The modular system of clause 44, wherein at least one of the first and second feeding modules is capable of applying a pushing force or a pulling force equivalent to a weight greater than 300 kg.

The invention claimed is:

1. An apparatus for cleaning a fluid conduit system in a hydrocarbon production installation while a fluid stream produced from a wellbore flows in the fluid conduit system to be cleaned, the apparatus comprising:

- a flexible hose comprising a bore and at least one outlet, the flexible hose having an inner diameter in the range of 5 mm to 60 mm and a minimum elastic bending radius of less than 100 times the inner diameter of the flexible hose, and the flexible hose comprising a plastic inner core, a plastic outer layer and at least one metal layer disposed between the inner core and the outer layer;
- a pressure control device;
- a coupling for an opening of the fluid conduit system;
- at least one feeding module for engaging the flexible hose and imparting a pushing and/or pulling force on the flexible hose to introduce it through the pressure control device and into or out of the fluid conduit system; and
- a pump configured to pump a cleaning fluid into the bore of the flexible hose and expel the cleaning fluid into the fluid conduit system through the at least one outlet in the flexible hose.

2. The apparatus of claim 1, wherein the flexible hose has a minimum elastic bending radius of less than 40 times the inner diameter of the flexible hose.

3. The apparatus of claim 1, comprising a nozzle configured to produce a rearward fluid jet which provides a propulsive force on the flexible hose.

4. The apparatus of claim 1, wherein the feeding module comprises a drive mechanism, wherein the drive mechanism is configured to engage with an outer surface of the flexible hose by forming indentations in the outer surface of the flexible hose.

5. The apparatus of claim 4, wherein the drive mechanism comprises at least one chain and one or more chain blocks, and wherein the one or more chain blocks comprises a concave surface which is part-circular in profile.

6. The apparatus of claim 5, wherein chain blocks comprise teeth or ridges, and the teeth or ridges are shaped to provide a directional engagement with the flexible hose.

7. The apparatus of claim 1, wherein the apparatus comprises a chamber located between the pressure control device and an opening for coupling to the fluid conduit system, and the chamber provides access to the flexible hose at a location below the pressure control device.

8. The apparatus of claim 1, further comprising at least one of: a blowout preventer; a cutting device configured to cut, shear, or sever the flexible hose; and a gripping mechanism arranged to retain a portion of the flexible hose in the apparatus.

9. The apparatus of claim 1, wherein the fluid conduit system comprises: a produced fluid conduit; a marine riser; a closed drain; a heat exchange system; or process pipe work.

10. An apparatus for cleaning a fluid conduit in a hydrocarbon production installation, the apparatus comprising:

- a flexible hose comprising a bore and at least one outlet, the flexible hose having an inner diameter in the range of 5 mm to 60 mm and a minimum elastic bending radius of less than 100 times the inner diameter of the flexible hose;
- a pressure control device;
- a coupling for an opening of a fluid conduit system;
- a feeding module for engaging the flexible hose and imparting a pushing and/or pulling force on the flexible hose to introduce it through the pressure control device and into or out of the fluid conduit system, wherein the feeding module comprises a drive mechanism, wherein the drive mechanism is configured to engage with an outer surface of the flexible hose by forming indentations in the outer surface of the flexible hose, wherein the drive mechanism comprises at least one chain and one or more chain blocks, and wherein the one or more chain blocks comprises a concave surface which is part-circular in profile; and
- a pump configured to pump a cleaning fluid into the bore of the flexible hose and expel the cleaning fluid into the conduit through the at least one outlet in the flexible hose.

11. An apparatus for cleaning a fluid conduit in a hydrocarbon production installation, the apparatus comprising:

- a flexible hose comprising a bore and at least one outlet, the flexible hose having an inner diameter in the range of 5 mm to 60 mm and a minimum elastic bending radius of less than 100 times the inner diameter of the flexible hose;

a pressure control device;

a coupling for an opening of a fluid conduit system;

at least one feeding module for engaging the flexible hose and imparting a pushing and/or pulling force on the flexible hose to introduce it through the pressure control device and into or out of the fluid conduit system;

a pump configured to pump a cleaning fluid into the bore of the flexible hose and expel the cleaning fluid into the conduit through the at least one outlet in the flexible hose; and a chamber located between the pressure control device and an opening for coupling to the fluid conduit system, and the chamber provides access to the flexible hose at a location below the pressure control device.

12. The apparatus according to claim 1, wherein the pressure control device comprises a plurality of pack-off elements operable to be actuated against an outer surface of the flexible hose to allow the flexible hose to pass through the pressure control device while retaining pressure in the fluid conduit system.

* * * * *